March 28, 1944. A. J. MACDONALD 2,344,994
COMPOUND MEASURING DEVICE
Filed April 16, 1942 3 Sheets-Sheet 3

INVENTOR.
Alan J. Macdonald
BY Ivan D. Thornburgh
Charles H. Cine
ATTORNEYS

Patented Mar. 28, 1944

2,344,994

UNITED STATES PATENT OFFICE 2,344,994

COMPOUND MEASURING DEVICE

Alan J. Macdonald, Hamilton, Ontario, Canada, assignor to American Can Company, New York, N. Y., a corporation of New Jersey Application April 16, 1942, Serial No. 439,283

12 Claims. (Cl. 113—89)

The present invention relates to a measuring device and has particular reference to a device for determining the amount of gasket sealing compound which is applied to a can part, such as that deposited in the flange of a can end, to provide an air-tight sealing medium for a can joint.

In the lining of a can part, such as a can end, with a liquid compound to provide for a hermetic seal or joint between the can end and the can body, it is a usual practice to deposit a desired amount of the compound, as through a nozzle, upon the flange of the end after which the lined end is heated to drive off the solvents of the liquid mixture leaving the solid part of the compound as a dried gasket film which when the end is applied to the can body enters into the joint and provides an air-tight seal between the can parts.

The present invention contemplates a measuring device which may be a part of, or which may be secured to or closely associated with a compound lining machine in such a manner as to provide for accurate, quick determination of the amount of liquid compound applied to each can part. From this determination definite knowledge of the thickness of the gasket film after drying of the compound is available immediately without interfering with the lining procedure and without the necessity of first drying the lined part as an incident to lineal measurement of the thickness of the deposited film.

An object of the present invention is the provision of a measuring device for a gasket lining machine by means of which a measurement may be obtained during the lining period, which measurement is directly related to and from which can be determined the thickness of the gasket film subsequently resulting after the deposited compound has been dried.

Another object of the invention is the provision of a measuring unit for incorporation in a compound can end lining machine which is available at any desired time for establishing the relationship between the amount of compound going into or applied to the flanges of can ends and the number of ends being lined, so that the dried film thickness of the joint gasket may be determined.

Yet another object is the provision of a measuring device of the character described by means of which the number of can ends, passing through the compound lining machine during a measuring period, is counted during which time a known predetermined volume of the liquid compound is being deposited.

A further object is the provision of such a measuring device wherein a body of liquid electrolyte and a body of insulating liquid, confined between diaphragms which are in contact with and which are controlled by the liquid compound passing into the can ends, provide for electrical actuation of a can end counting mechanism during such a lining operation.

Another object is the provision of a compound measuring unit for a can end lining machine which is actuated by compound under pressure flowing through a conduit and discharging through a nozzle into the end, the compound in two sections of the conduit being in contact with diaphragms arranged on opposite ends of a liquid chamber whereby blocking of the conduit between the diaphragms during the lining operation causes maintenance of pressure on the nozzle side of the conduit only through the liquid chamber as the diaphragms move to counteract the removal of compound at that time through the nozzle.

Still another object is the provision, in such a diaphragm controlled measuring unit of a liquid chamber containing two different specific gravity liquids, one of which is electro-conducting and the other electro-insulating and wherein the change of position of these liquids during movement of the diaphragms controls the beginning and the ending of a measuring period, at which time there is determined the exact number of can ends lined with a known volume of compound.

Numerous other objects and advantages of the invention will be apparent as it is better understood from the following description, which, taken in connection with the accompanying drawings, discloses a preferred embodiment thereof.

Referring to the drawings.

In the operation of lining the flange of a can end with a liquid compound it is usual to feed the ends individually from a magazine and place each end in lining position at a lining station. The present invention is particularly concerned with determining the number of ends which are lined with a given amount of compound. The compound is fed from a tank or reservoir under pressure and is discharged through a nozzle. The measuring unit of the present invention is directly associated with the passage of compound from the tank to the nozzle and is arranged so that by manually operating a valve, the lining conditions are changed sufficiently to permit measuring without stopping the regular lining of the can ends.

When manual operation of such a valve takes place, the pressure within the tank (which is applied to the surface of the compound) is blocked off along the stream of compound passing from the tank to the nozzle. Since the lining compound is incompressible, this blocking of the flow of compound along the regular channel would immediately stop the lining operation if provision was not made for continuing such lining operation through a measuring period and thereafter.

In the apparatus disclosed a diaphragm controlled body of liquid is utilized to maintain pressure on the isolated volume of compound which has ben blocked off from direct connection with the tank. The lining of the can ends thus continues without interruption. This body of diaphragm control liquid is independent of the liquid compound.

The tank pressure operating against one diaphragm and through the body of liquid is transmitted to the isolated blocked-off compound. This maintenance of tank pressure against the isolated body of compound is maintained throughout the period by shifting of the body of liquid which is interposed between the diaphragms. This imposed pressure takes place as long as the diaphragms move to compensate for loss of pressure such as otherwise would result from removal of the compound in the lining operation.

The body of this pressure liquid consists of two independent liquids. The liquids are different in weight, the one having less specific gravity being an insulating liquid (electrically) which rests directly upon the heavier liquid. This heavier liquid being electro-conducting constitutes an electrolyte. The two liquids are confined at all times between the two diaphragms.

Electrical contacts are disposed in the body of pressure liquid and as soon as the compound is blocked off from the tank supply and is isolated for lining can ends during the measuring period, both liquids change position as the diaphragms move. There are several electrical circuits used in the measuring unit and the first electrical result of this change in position of the two liquids is the breaking of an electrical circuit at one of the contacts.

The electrolyte is grounded at one side and the circuit involving the first contact thus is broken by the receding electrolyte. This results in actuation of an electrical and counting device associated with the can end feed mechanism. This constitutes the beginning of the measuring period. Each can end lined during this period is counted. As the electrolyte recedes under further change of diaphragm position a position is reached where the electrolyte leaves the second contact. The break at this point terminates the counting of the ends. This constitutes the ending of the measuring period.

With this procedure there is obtained the exact number of ends which have been lined between the time the first contact is broken and the breaking of the second contact. Since the percentage of solids in the liquid compound is known and since the volume of compound used during this measuring period depends on the actual tank pressure and also is known, the counting of the ends provides immediate information as to the amount of compound flowing into each end and the amount of solid material for such an end. The thickness of the dried film for an end being lined is at once a matter of mathematical calculation.

By means of this measuring of the compound during an actual lining period without stopping the operation, compound is saved and a more uniform lining of each end is obtained. Such a device also dispenses with inspection of the lined ends and there is no loss of samples since no samples are used. Heretofore this has been the only means of obtaining information as to the gasket thickness. Since it is not necessary to actually measure the compound in the can end much time is gained. In addition the machine may be operated at a higher speed.

If the results of a measurement determination show that the proper thickness of compound is not being obtained, it is only necessary to change the pressure upon the compound tank in order to vary the actual amount of compound going into each end. For example, if the compound measurement is low and more compound is desired, the tank pressure is increased so that more compound will be forced through the lining nozzle in a given time and a greater total compound will be applied to the end.

Figure 3:
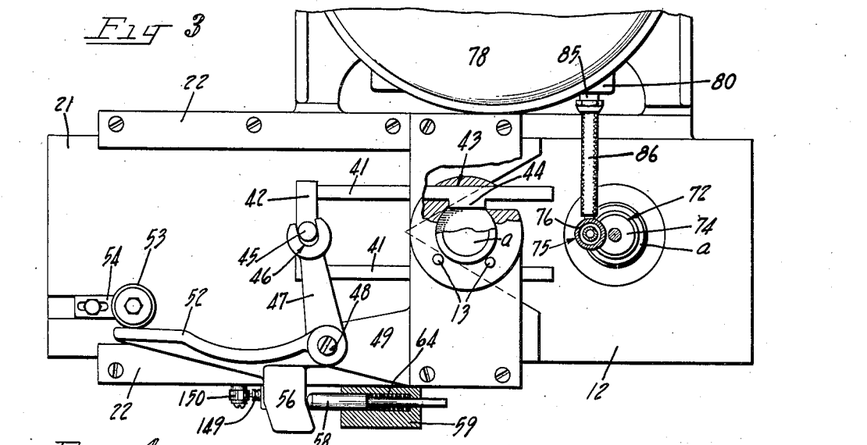
Fig. 3 is a fragmentary plan view of the device shown in Fig. 1, with parts shown in section.

The measuring device of the present invention may be applied as a separate unit to a regular conventional compound end lining machine or it may be built in as a part of the machine. The latter type of machine is illustrated herein. The regular lining mechanism may be such as is shown in the R. W. Reid United States Patent 2,085,767. Parts of the Reid end feeding device have been illustrated in the drawings and reference should first be made to Figs. 3 and 5 for this feature.

The lining machine constitutes a main frame 11 on which most of the working parts are supported. Such a frame is formed with a table 12. A can end magazine broadly designated by the numeral 13, is carried upon the table top 12 and provides for a stack of can ends $a$. This constitutes the end supply which is located just above the table in position for feeding to the lining station.

The lowermost can end $a$ after being cut off from the bottom of the stack is advanced to the compound lining station by a reciprocating feed slide 21. This slide moves in slideways and is held in place by side gibs 22 carried by the table 12. The slide 21 is provided with a depending lug 26 which is pivotally connected to one end of a connecting rod 29. The opposite end of the rod is connected to a crank 33 mounted on one end of a main drive shaft 34 which is journaled in suitable bearings in the frame 11.

A pair of slide bars 41 move back and forth over the upper surface of the slide 21 and provide for separation of the lowermost can end *a* from the stack. The bars are secured together by a crosspiece 42 and pass through slots 43 formed in the magazine 13. Bars 41 are provided with diametrically opposed inwardly extending projections 44 which act as separator blades for engaging between the lowermost can end in the stack and the end directly thereabove.

The crosspiece 42 carries a pin 45 which engages within a slot 46 formed in one end of an arm 47 of a bell crank lever. This bell crank lever is pivoted at 48 to an extension 49 projecting from the magazine. A second arm of the bell crank lever is formed as a cam arm 52 which extends at right angles to the lever arm 47.

The cam arm 52 is yieldably held in engagement with a roller 53 rotatably mounted on a bracket 54 which in turn is secured to the top of the slide 21. The arm 52 is provided with a right angled extension 56 (see also Fig. 4) which is engaged by the rounded end of a pin 58. This pin is slidably mounted in a block 59 secured to the frame of the machine.

A spring 64 is carried in the block 59 and surrounds a reduced end of the pin 58 and yieldably holds the pin against the extension 56 which in turn tends to rock the bell crank lever on its pivot 48. At the proper time the slide bars 41 are moved to disengage their projections 44 from the stack of ends to release the lowermost can end *a* for feeding as the cam arm swings into the position shown in Fig. 4.

After separation of a can end *a* from the magazine, the slide 21 pushes this end over the surface of the table and into a compound lining station 72. The can end *a* will have the usual peripheral flange *b* (Fig. 8) into which is flowed the compound. After heating, the solvents of the compound are driven off leaving a thin film ring *c* of compound. The thickness of such a ring *c* determines in large part the efficiency of the gasket and the measuring unit of the present invention is for the purpose of determining the thickness of the ring when dried so that a greater or less thickness may be obtained without interrupting the lining operation.

At the lining station 72, the can end rests upon a chuck 73. This chuck is lifted in proper time to engage the can end from below and at the same time a chuck 74 is brought down to clamp the end in lining position. The actual lining of the flange of the end is effected by discharging liquid into the flange while rotating the end on a vertical axis and beneath a discharge nozzle 75.

It will be understood that the nozzle is arranged with the usual needle valve for cutting off a flow of compound while the can end is being brought into lining position upon the chuck 73 and after the lining has been completed for that end. These devices are well known in the art and it is believed need no further explanation.

The nozzle 75 (Figs. 1 and 5) is secured to the lower end of a lining head 76. The liquid compound for lining is carried in a tank 77 which may be sealed air-tight by a cover 78. This tank rests upon brackets 79 which are mounted upon the top of an upper housing block 80. Block 80 in turn is supported on a lower housing block 81 and both housing blocks rest upon the main frame 11.

The compound passes out of the bottom of the tank 77 by way of a pipe 82. This pipe 82 is disposed in a vertical position and may be an integral neck part of a front plate 83 which tightly fits on the front faces of the housing blocks 80 and 81. This plate extends down below the housing block 81. A passageway extends nearly to the bottom of this front plate and with the inside of the pipe 82 constitutes a conduit B for the compound passing from the tank. At the bottom, the passageway in the front plate 83 joins a horizontal passageway formed in a bottom plate 84 which tightly fits against the lower surface of the housing block 81. Such a passageway also is a part of the conduit B and at the side opposite to the front plate is reduced as a pipe section 85. A flexible hose 86 connects the conduit B with the lining nozzle 75, such a hose being secured at one end to the pipe 85 and at its other end to the lining head 76.

Intermediate the vertical section of the conduit B, that is below the central part of the front plate 83, a valve 91 is provided for blocking off passage of compound through the conduit. Closing of this valve is the first step in placing the measuring unit in operating condition.

Figures 1, 2:
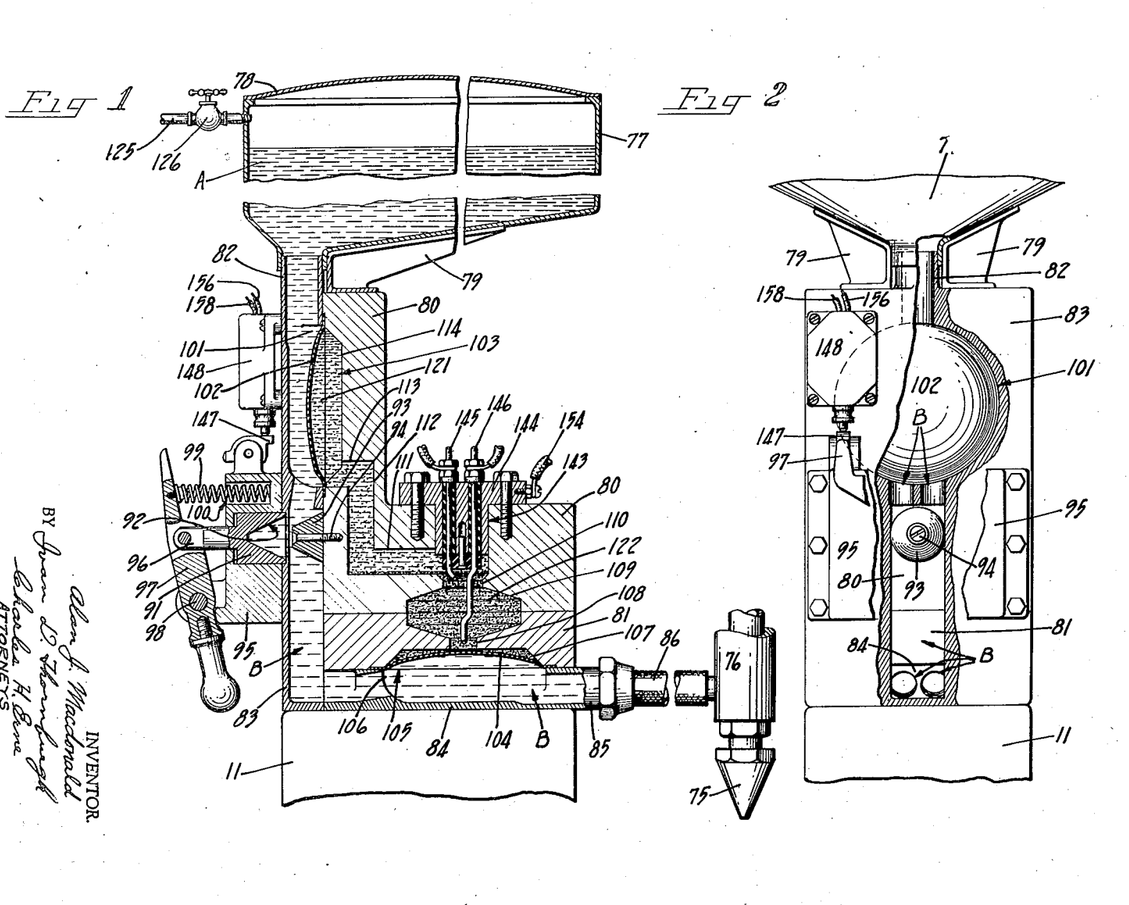
Figure 1 is a longitudinal vertical section taken through a part of a can end lining machine embodying the present invention and showing a measuring unit at the time of a regular end lining operation.
Fig. 2 is a front elevation of such a machine with parts broken away and parts shown in section.

Valve 91 is formed as a cylindrical head having a central conical recess 92 which is adapted to fit tightly against a cone block 93 when the valve is closed. The cone block is mounted on the inside of the lower half of the vertical passageway of the conduit. This cone block is fixed, being held against the face of the housing block 80 by a screw 94. The valve head slides in a bracket 95 which is bolted on the outer face of the front plate 83 (Fig. 2).

Valve 91 may be closed by hand and is held closed for a measuring period. The valve head is formed with a stem 96 which is connected in a loose pivotal connection to a lever arm 97 pivoted at 98 in the bracket 95. The lower end of this lever arm is provided with a convenient hand grip so that the lever arm may be swung on its pivot 98. At the top, the lever arm engages one end of a coil compression spring 99 which is housed in a pocket 100 formed in the bracket 95. Fig. 1 illustrates the open position of the valve 91 and this is the position of the valve during the regular lining of the can ends.

The front plate 83 immediately above the valve member 93 houses a circular enlargement 101 of the conduit B (see Figs. 1 and 2) and this provides for a vertically disposed upper diaphragm 102. The rear wall of the pipe 82 is cut out at this position for the diaphragm and the diaphragm is clamped securely at its edges in a circular recess cut in the face of the housing block 80 where its flange is clamped tightly by the front plate. This provides a liquid tight joint.

Diaphragm 102 is the upper diaphragm for a liquid chamber 103 which extends through a zigzag course in the block 80 and on into the lower block 81. The chamber at its lower end terminates just above a second or lower diaphragm 104. The diaphragm 104 when the parts are in the position of Fig. 1, extends through an opening 105 which is cut out in the roof of the bottom plate 84, the conduit B at this place being expanded into a circular enlargement 106 (Fig. 1) similar to the enlargement 101 of the upper front plate.

Diaphragm 104 is clamped at its peripheral edges between the bottom plate 84 and the lower block 81. The flange of the diaphragm rests in a circular recess cut in the lower face of the block 81. In this position, the lower diaphragm extends up into a countersink basin or recess 107 formed in the block 81, this basin being the lowermost part of the liquid chamber 103.

At the top, the countersink basin 107 of the liquid chamber 103, is in communication with a reduced diameter opening 108 which leads directly into an expanded chamber space 109 which is formed in both housing blocks 80, 81. At the top of this space a vertical passageway 110 is cut in the block 80, this being centered with the opening 108 below. A horizontal channel 111 formed in the block 80 joins at one end with the passageway 110 and at the opposite end with a vertical bore 112 which at its top extends into a junction opening 113 located at the bottom of a vertical countersink basin 114 cut in the front face of the block 80 and providing for movement of the upper diaphragm 102.

The liquid chamber 103 is filled completely with two liquids of different specific gravity. In the upper part of the chamber, that is in the parts 111, 112, 113 and 114, when the diaphragms are in the normal position of Fig. 1, an electro-insulating liquid 121 is located, this liquid in the countersink basin 114 being in contact with the adjacent face of the diaphragm 102. At the bottom of the liquid chamber an electro-conductive liquid 122 (an electrolyte) is located, this electrolyte in the countersink basin 107 resting against the upper surface of the lower diaphragm 104 and extending up into the chamber sections 108, 109, 110 and even up to the channel 111.

The specific gravity of the electrolyte 122 is greater than the specific gravity of the insulating liquid 121 and the lighter liquid will always remain at the top, the line of contact being at all times distinct and presenting a horizontal upper surface for the electrolyte. A suitable insulating liquid 121 may be a high boiling point naphtha, this liquid having a satisfactory specific gravity for the purpose. The electrolyte liquid which has been found satisfactory is a mixture of distilled water and a small quantity of ethylene glycol, the conventional anti-freeze liquid for automobiles, etc.

Since the two liquids 121, 122 completely fill the liquid chamber 103 any movement of one diaphragm is transmitted immediately to the other diaphragm. During such movement the two liquids shift positions and fill or partially fill different spaces, openings and passageways, etc., but the line of contact between the liquids remains as a horizontal surface and this is utilized to make and break electrical circuits, as will be explained fully hereinafter.

A pressure is maintained in the tank 77 upon the surface of the compound A. Such a pressure may be effected by compressed air in the head space within the sealed tank 77. For this purpose an air supply line 125 connects with the tank and extends through a side into the head space above the compound. A valve 126 in the air line provides for manual control of the air pressure admitted to the tank.

It has been found that this air pressure for usual can end lining conditions may be approximately thirty pounds to the square inch. The compound lining material is sufficiently viscous to offer resistance to flowing and it has been found that with a pressure of thirty pounds in the tank 77, a given quantity of compound is passed through the nozzle 75 for a given number of can ends. Since this compound contains known percentages of solids and solvents, a determination of the amount of compound which flows into a known number of can ends through the nozzle 75 gives all of the necessary information indicative to the thickness of lining film remaining in the lined can end after it has been dried and after the solvents have been evaporated without having to wait for such curing of the lining gasket.

Under normal lining conditions, the relative position of the diaphragms 102, 104 is as shown in Fig. 1. In this position of the electrolyte the measuring unit is inoperative and no measuring of compound takes place. When it is desired to perform the measuring operation the hand valve 91 is moved from the position illustrated in Fig. 1 into that shown in Fig. 6. It must be held in this position with the conical block 93 seated tightly within the conical opening 92 of the valve. It is so held against the action of the spring 99 and when the handle lever 97 is released the spring returns the parts to the position of Fig. 1. Closing and later opening of the valve is performed without interrupting the lining operation even though compound no longer flows from the tank.

The closing of the valve 91 blocks off the vertical section of the conduit B but as the removal of compound from the horizontal section of the conduit continues there is the tendency for diminution of the tank pressure in the compound below the valve. This pressure, however, is maintained by a shifting of the two diaphragms so that the pressure on the compound above the valve is transmitted by way of the two liquids 121, 122 to the compound below the valve and as each can end lined takes its quantity of compound the diaphragms move just enough to maintain the tank pressure on the remaining compound in the line leading to the lining nozzle 75.

Figures 4, 5:
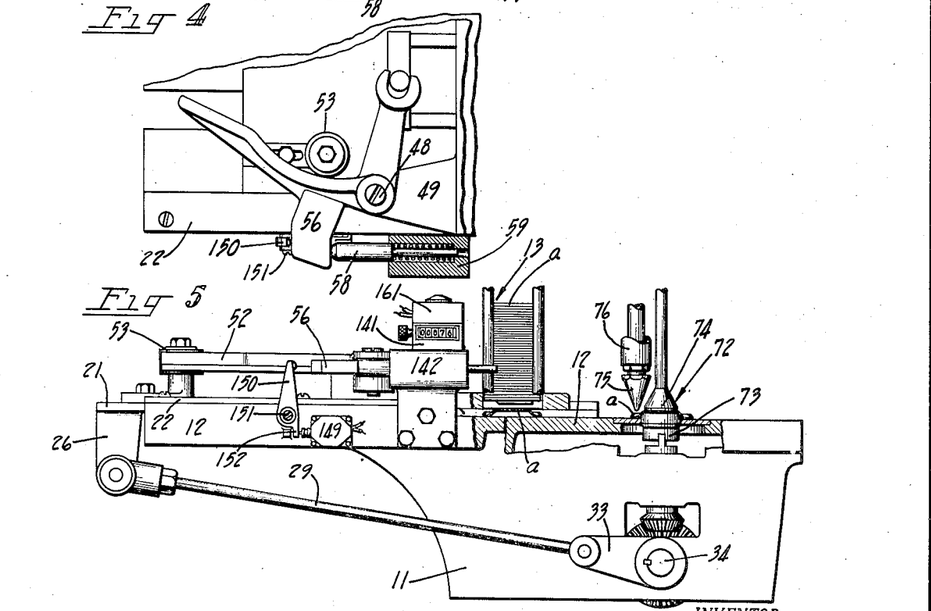
Fig. 4 is a plan fragment of a part of the mechanism illustrated in Fig. 3 and showing the movable parts in a different position.
Fig. 5 is a side elevation of a portion of the machine illustrated in Fig. 3.
Figures 6, 7, 8, 9:
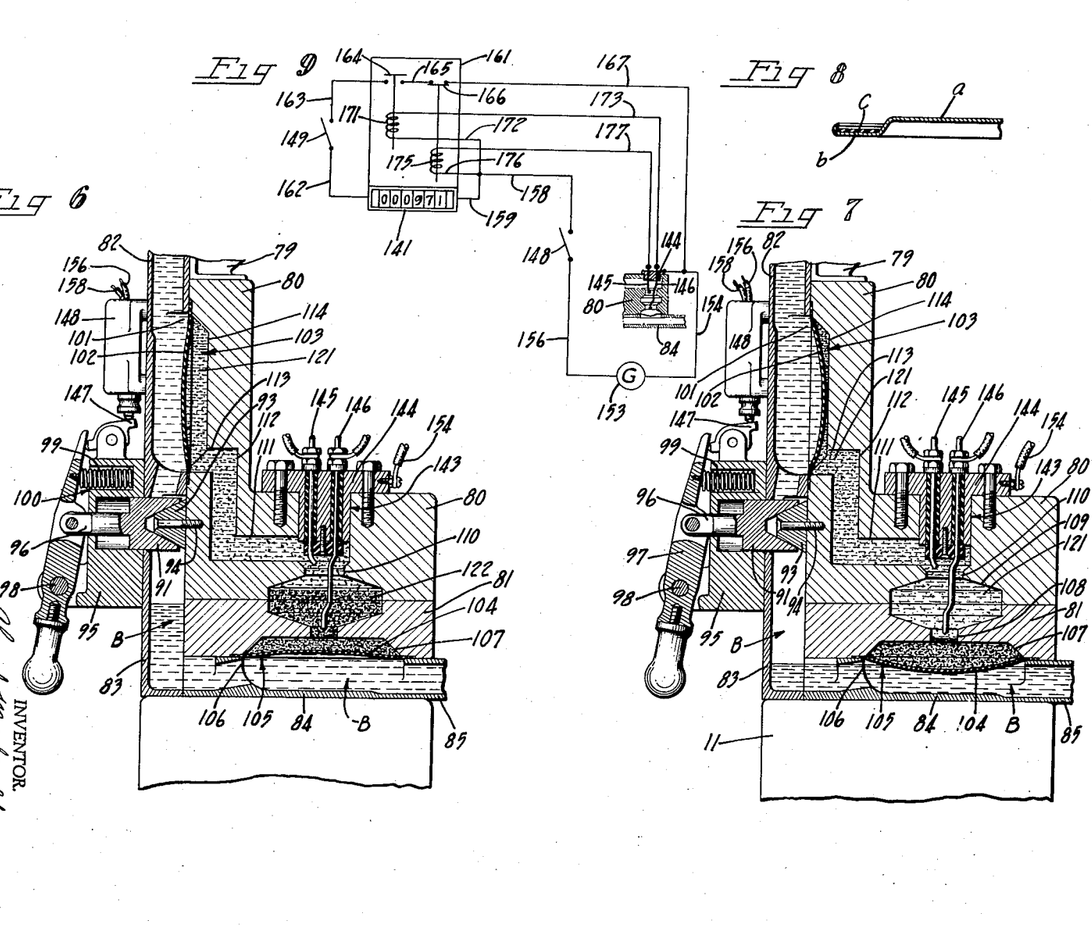
Figs. 6 and 7 are vertical sectional views similar to Fig. 1 and showing the parts in different positions, Fig. 6 illustrating the device during the measuring period and Fig. 7 illustrating the arrangement of parts following the measuring period.
Fig. 8 is an enlarged sectional detail of a can end illustrating a compound gasket in the flange of the end.
Fig. 9 is a wiring diagram of the machine.

Fig. 6 shows an intermediate stage of the measuring period. In other words, the measuring period has begun but has not ended. The change of position of the two liquids 121, 122 within the chamber 103 is used in connection with certain electrical circuits for actuating an electrically operated can end counter 141 (Figs. 5 and 9). This counter is mounted on a bracket 142 bolted to the side of the end feed table 12. It begins to count ends when the measuring period begins and it stops counting when the period ends. The top level of the electrolyte 122 is used to make and break the circuits of the counter 141 at certain contacts which will be considered at this time.

The housing block 80 (Fig. 1) is cut through in a vertical opening 143 which extends up from the end of the channel 111 and in axial alignment with the passageway 110. This opening provides a liquid-tight fit for the depending stem of a metal bushing 144 which is bolted to the housing block. Bushing 144 is in electrical contact, i. e., grounded, to the block. The bushing carries a short contact pin 145 and a long contact pin 146. Both pins are insulated from the bushing.

The short contact pin 145 projects down into the passageway 110 while the longer contact pin extends as far down as the opening 108 in the housing block 81. The protruding ends of both contact pins are disposed in the body of liquid within the liquid chamber 103. In Fig. 1, both contact pin ends are disposed in the electrolyte 122 and in such position electricity may flow between each respective contact and the grounded bushing 144 by way of the electrolyte 122 and the block 80.

Before considering these electrical circuits, attention will be given to certain electric switches used in the electrical functioning of the measuring unit. Each time the hand lever 97 is moved to close the valve 91 the upper end of the lever strikes against a rocking block 147 (see also Fig. 2) which is pivoted in the bracket 95. Rocking of the block 147 into the position shown in Figs. 6 and 7, which is the held position, closes an electrical circuit through a switch 148 which is secured to the front plate 33 just above the bracket 95.

The can end counter 141 is operated by a make and break electrical circuit and the circuit is broken mechanically each time the feed slide 21 (Figs. 3, 4 and 5) moves forward. A switch 149 is secured to the end feed table 12 adjacent the counter bracket 142. Each time the slide moves a can end into lining position as when the cam arm 52 swings over into the position of Fig. 4, its extension 56 strikes against the upper end of a vertically disposed lever 150 (Fig. 5).

Lever 150 is pivotally mounted at 151 to the side of the table 12. This striking of the lever 150 causes it to move counter-clockwise. A lower end 152 of the lever strikes against a projecting stem and closes the switch 149. When the cam arm swings back the arm extension leaves the lever 150 which may be properly weighted to swing back into the position of Fig. 5. The switch 149 immediately opens. Thus the counter 141 turns up or is advanced one additional count each time the circuit is closed and opened. Attention now is directed to the wiring diagram of Fig. 9.

A generator 153 for producing the proper electrical energy is connected by a wire 154 to the bushing 144. A second lead wire 156 extends from the other side of the generator and connects to the switch 148. A wire 158 leads from the other side of the switch and joins a wire 159 one end of which passes to the counter 141. Parts of this circuit as well as parts of other circuits of the apparatus preferably are confined within a wiring box 161 which may be mounted directly on top of the counter 141, as illustrated in Fig. 5.

The opposite side of the electric counter 141 (Fig. 9) is connected by a wire 162 to the make and break switch 149 (see also Fig. 5). A wire 163 connects the opposite side of the switch 149 to a switch 164 disposed in the wiring box 161. Switch 164 is connected by a wire 165 to a second switch 166 also enclosed within the box. A wire 167 leads from the switch 166 to the lead wire 154.

The wiring diagram of Fig. 9 shows both switches 148 and 149 open and accordingly current is not flowing from the generator. This is the condition during normal operation of the lining machine. The switch 164 is a normally open switch being held closed by a spring or other suitable device. It may be closed by energizing a solenoid connected with the switch. The switch 166 on the other hand is a normally closed switch, spring held but controlled by a solenoid.

The switch 164 and its solenoid also are confined within the box 161. The solenoid coil designated by the numeral 171 is connected by a wire 172 to the wire 158. The other side of the coil is connected by a wire 173 to the long contact pin 146 which is carried in the bushing 144. The switch 166 and its solenoid, contained in the box 161 has its solenoid coil designated by the numeral 175. Such a coil is joined by a wire 176 to the wire 158 and by a wire 177 to the short contact pin 145. The effect of closing certain of the switches and the operation of counting the can ends during a measuring period will now be considered.

During the normal lining of the can ends the electrolyte 122 in the liquid chamber 103 is in the position illustrated in Fig. 1. In this position the electrolyte covers the ends of both of the contact pins 145, 146. At this time, however, switch 148 is open and therefore current cannot flow from the generator 153 as the circuit is broken in the lead wire 156 at the switch.

As soon as the valve 91 is closed by operation of the hand lever 97, the switch 148 is closed. Current thereupon flows from the generator 153 through the switch 148 by way of the wires 156, 158, 176 through the coil 175 of the solenoid operated switch 166 through the wire 177, the short contact 145, electrolyte 122, bushing 144 and wire 154 back to the generator. This energizes the solenoid coil 175 and the normally closed switch 166 immediately opens.

At the same time current also flows from the wire 158 by way of wire 172 through the solenoid coil 171 of the switch 164 and thence by wire 173 through the long contact pin 146, electrolyte 122, bushing 144, and wire 154 back to the generator. This energizes the solenoid coil 171 so that the normally open switch 164 immediately closes. The measuring period has not begun and counter 141 is not actuated as that action requires the closing of both switches 164 and 166.

The lining of the can ends proceeds without interruption but closing of the valve 91 and switch 148 marks the beginning of a change in the diaphragm positions and in the movement of the electrolyte 122. The beginning of the measuring period, which is the time when counting of can ends begins, takes place as soon as the upper surface of the electrolyte 122 leaves the terminal end of the short contact pin 145 as the body of liquid in the liquid chamber 103 moves down with the flexing of the diaphragms 102, 104.

At this point the electric current which has been flowing through the solenoid coil 175 of the switch 166 is interrupted by breaking of this circuit and the switch immediately closes. A counting circuit now is established since both switches 164 and 166 are closed but the current flows only when the make and break switch 149 associated with the can end feeding mechanism closes, as already explained.

Each time the switch 149 is closed current thereupon flows through the counter 141 along the following course. From the generator 153 current flows through the closed switch 148 by way of wires 156, 158, 159 into the counter 141. From the counter current flows through the wires 162, 163 through the closed switch 149, thence through the closed switch 164, wire 165, closed switch 166 and wire 167 back to the lead wire 154 and the generator.

As long as the electrolyte is receding and the long contact pin 146 is covered with the electrolyte liquid 122 and as long as the valve 91 is held in to close the switch 148, this current flows each time the make and break switch 149 closes. This is the measuring period. Fig. 6 shows a time during the counting and measuring period. As previously explained, the making and breaking of the electric current passing through the counter 141 actuates the counter to designate the number of can ends being lined.

The measuring period extends until the receding electrolyte surface leaves the terminal end of the long contact pin 146. When this happens the current passing through the solenoid core 171 of the switch 164 is interrupted by breaking of the circuit between the contact pin and the electrolyte and the deenergizing of the solenoid permits the switch 164 to snap open, thus breaking the current through the counting device 141. Counting thereupon stops even though the switch 148 is held closed.

In fact, for the correct operation of the measuring device switch 148 must be held closed until after the counter stops operating. Thereupon the hand lever 97 is released and the valve 91 springs open. Fig. 7 shows the position of the liquids 121, 122 when this action takes place.

The normal lining operation continues as the diaphragms 102, 104 and the liquids 121, 122 in the intervening chamber 103 readjust back to the normal position of Fig. 1. The same amount of compound will be delivered in each can end whether the measuring period is on or off inasmuch as the predetermined pressure in the head space of the compound tank 77 determines the rate of lining. This is constant regardless of how the pressure is transmitted. In one case pressure is transmitted through the compound itself, in the other case it is transmitted by way of the liquids 121, 122.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a compound measuring unit for container lining machines, the combination of a supply tank for holding the compound, a conduit for conveying liquid compound from said tank for the lining operation, means for applying pressure to the compound in said tank to effect the lining operation, devices in said conduit for isolating a quantity of compound from said supply tank, and measuring means associated with said conduit and connecting with said pressure means and controlled by the pressure on said isolated compound for determining the amount of compound for each container part being lined.

2. In a compound measuring unit for container lining machines, the combination of a supply tank for holding the compound, a conduit for conveying liquid compound from said tank for the lining operation, means for applying pressure to the compound in said tank to effect the lining operation, devices in said conduit for isolating a quantity of compound for said supply tank, means for maintaining the tank pressure on said isolated compound, and measuring means associated with said conduit and controlled by the maintained pressure on said isolated compound for determining the amount of compound for each container part being lined.

3. In a compound measuring unit for container lining machines, the combination of a supply tank for holding the compound, a lining nozzle, a conduit for conveying liquid compound from said tank to said nozzle for the lining operation, means for applying pressure to the surface of the compound in said tank to discharge the compound from said nozzle, devices in said conduit for blocking the passage of compound from said supply tank and for isolating a quantity of the compound, a body of liquid interposed between parts of the conduit on opposite sides of said blocking devices for transmitting the tank pressure to said isolated compound, and measuring means associated with said conduit and controlled through said body of liquid by the pressure exerted thereon for determining the amount of compound for each container part being lined.

4. In a compound measuring unit for can end lining machines, the combination of a supply tank for holding the compound, a conduit for conveying liquid compound from said tank for the lining operation, means for applying pressure to the compound in said tank for discharging compound from said conduit to effect the lining operation, a valve located in said conduit for isolating a quantity of compound from said supply tank, means for maintaining said discharge pressure on the isolated compound to continue the lining operation, and a counter device associated with the isolated compound operable and controlled by said discharge pressure maintaining means against the isolated compound for determining the number of can ends lined with a given quantity of liquid compound.

5. In a compound measuring unit for can end lining machines, the combination of a supply tank for holding the compound, a lining nozzle for directing compound into the flange of a can end being lined, a conduit for conveying liquid compound from said tank to said nozzle for the lining operation, means for applying pressure to the compound in said tank to discharge the compound from said nozzle, a valve located in said conduit for blocking the passage of compound from said supply tank and for isolating a quantity of compound, a pair of diaphragms located in the walls of said conduit and spaced on opposite sides of said valve, a body of liquid interposed between said diaphragms for maintaining said discharge pressure on the isolated compound to discharge such compound from said nozzle, and measuring means associated with said conduit and controlled by the pressure exerted against said body of liquid for determining the amount of compound for each can end being lined.

6. In a compound measuring unit for can end lining machines, the combination of a supply tank for holding the compound, a conduit for conveying liquid compound down from said tank for the lining operation, means for applying pressure to the compound in said tank for discharging compound from said conduit to effect the lining operation, a valve located in said conduit for blocking the passage of compound from said supply tank and for isolating a quantity of compound, a pair of diaphragms located in the walls of said conduit and on opposite sides of said valve, the lower of said diaphragms being in contact with the isolated compound, two liquids of different specific gravity located one above the other with the heavier liquid in contact with the lower diaphragm and the lighter liquid in contact with the upper diaphragm by means of which the tank pressure is maintained on said isolated compound for a measuring period of continued can end lining, and measuring means operating in accordance with the contacting level of the two liquids for determining the amount of compound for each can end being lined during said measuring period.

7. In a compound measuring unit for can end lining machines, the combination of a supply tank for holding the compound, a nozzle for discharging compound into a can end, a conduit connecting with said supply tank and with said nozzle for conveying liquid compound for the lining operation, means for applying pressure to the compound in said tank for discharging compound from said nozzle in the lining operation, a valve located in said conduit for isolating a quantity of compound from said supply tank, means for maintaining said discharge pressure on the isolated compound to continue the lining operation, a can end counting device, and measuring means operable by said discharge pressure maintenance means for actuating said counting device to determine the number of lining operations for a given quantity of lining compound.

8. In a compound measuring unit for can end lining machines, the combination of a supply tank for holding the compound, a nozzle for discharging compound into the flange of a can end and at a level below said tank, a conduit formed with vertical and horizontal sections for connecting said supply tank with said nozzle, means for applying pressure to the compound in said tank for forcing the compound through said conduit and from said nozzle in the lining operation, a valve located in the vertical section of said conduit for blocking the flow of compound in said vertical section and for isolating a quantity of compound below the valve, an upper diaphragm located in the vertical conduit wall, a lower diaphragm located in the horizontal conduit wall, a body of liquid interposed between said diaphragms whereby said discharge tank pressure acting on the upper diaphragm is transmitted to the lower diaphragm, said diaphragms yielding as continuation of the lining operation through a measuring period removes compound from said horizontal conduit section, and measuring means operable by a yielding of said diaphragms for determining the amount of lining compound for each can end being lined.

9. In a compound measuring device for can end lining machines, the combination of a supply tank for holding the compound, a conduit connecting with said supply tank for conveying liquid compound for the lining operation, means for applying pressure to the compound in said tank for moving the compound along said conduit, a valve located in said conduit for isolating a quantity of compound from said supply tank, diaphragms disposed in the wall of said conduit and spaced on opposite sides of said valve, a body of liquid electrolyte and insulating liquid interposed between said diaphragms and movable during a measuring period following the closing of said valve as lining continues from said isolated compound and as said diaphragms are moved by said tank pressure, a can end counting device, an electrical means controlled by the movement of said electrolyte and insulating liquids for actuating said counting device to determine the number of lining operations for a given quantity of lining compound during the measuring period.

10. In a compound measuring unit for can end lining machines, the combination of a supply tank for holding the compound, a nozzle for discharging the compound into the flange of a can end and at a level below said tank, a conduit formed with vertical and horizontal sections for connecting said supply tank with said nozzle, means for applying pressure to the compound in said tank for forcing the compound through said conduit and from said nozzle in the lining operation, a valve located in the vertical section of said conduit for blocking the flow of compound in said vertical section and for isolating a quantity of compound below the valve, an upper diaphragm located in the vertical conduit wall, a lower diaphragm located in the horizontal conduit wall, a liquid electrolyte in contact with the lower diaphragm and an insulating liquid of less specific gravity carried on said electrolyte and extending up in contact with the upper diaphragm to provide a body of liquid interposed between said diaphragms whereby said discharge tank pressure acting on the upper diaphragm is transmitted to the lower diaphragm, said diaphragms yielding as continuation of the lining operation through a measuring period removes compound from said horizontal conduit section, and electrical measuring means operable by a change in position of said electrolyte for determining the amount of lining compound for each can end being lined during said measuring periods.

11. In a compound measuring unit for can end lining machines, the combination of a supply tank for holding the compound, a nozzle for discharging the compound into the flange of a can end, can end feeding devices for positioning a can end beneath said nozzle, a conduit for conveying compound from said supply tank to said nozzle, means for applying pressure to the compound in said tank for forcing the compound through said conduit and from said nozzle in the lining operation, a valve located in said conduit for blocking the flow of compound from said tank and for isolating a quantity of compound below the valve, a pair of diaphragms disposed in the wall of said conduit and spaced on opposite sides of said valve with one diaphragm in contact with said isolated compound, a body of liquid consisting of an insulator and an electrolyte interposed between said diaphragms whereby said discharge tank pressure acting on one diaphragm is transmitted to the other so that the diaphragms yield as the lining operation continues through a measuring period as a part of said isolated compound is removed, electrical contacts in said body of liquid, a can end counting device, and electrical means operating through said contacts when said body of liquid is in certain condition as the result of said diaphragm yielding for actuating said counting device to determine the number of ends lined with a predetermined quantity of said isolated compound during said measuring period.

12. In a compound measuring unit for can end lining machines, the combination of a can end support, feeding devices for feeding a can end to said support, a nozzle for discharging compound into the flange of a can end on said support, a conduit formed with connecting vertical and horizontal sections for feeding compound to said nozzle, means for applying pressure to the compound in said conduit to discharge it from said nozzle in the lining operation, a valve located in the vertical section of said conduit for blocking the flow of compound in the vertical section and for isolating a quantity of compound between the valve and said nozzle, an upper diaphragm located in the vertical conduit wall, a lower diaphragm located in the horizontal conduit wall, a liquid chamber extending between said diaphragms, a liquid electrolyte confined in the lower part of said chamber and carried on said lower diaphragm, an insulating liquid having a less specific gravity than said electrolyte confined in the upper part of said chamber and extending from said upper diaphragm down to and resting on said heavier electrolyte, said liquids providing for simultaneous movement of said diaphragms, upper and lower contact members mounted in said liquid chamber with the walls of the chamber grounded as one side of electric circuits in which said contacts form the opposite side, a can end counting device actuated during a measuring period by said can end feeding devices for counting the number of can ends being lined during such a period when said conduit pressure is changing the said diaphragms to lower said confined electrolyte and break a circuit between the ground and said upper contact to begin operation of said counting device at the beginning of the measuring period and to break a circuit between the ground and the lower contact to stop operation of the counting device at the end of the measuring period whereby determination is had of the amount of compound going into each can end being lined.

ALAN J. MACDONALD.